(12) United States Patent
Louh

(10) Patent No.: US 6,478,276 B1
(45) Date of Patent: Nov. 12, 2002

(54) CAR PHONE HOLDER WITH A UNIVERSAL JOINT

(76) Inventor: Richard Louh, No. 331, Chung-Fong Road, Lung-Tan Hsiang, TaoyuanHsien (TW)

(*) Notice: Subject to any disclaimer, the term of this patent is extended or adjusted under 35 U.S.C. 154(b) by 0 days.

(21) Appl. No.: 09/861,537

(22) Filed: May 22, 2001

(51) Int. Cl.⁷ .................................................. A47F 5/00
(52) U.S. Cl. .............................. 248/309.1; 248/346.06
(58) Field of Search ............................. 248/309.1, 310, 248/288.31, 222.52, 225.11, 346.06

(56) References Cited

U.S. PATENT DOCUMENTS

| | | | | |
|---|---|---|---|---|
| 5,179,590 A | * | 1/1993 | Wang | 379/454 |
| 5,187,744 A | * | 2/1993 | Richter | 379/449 |
| 5,392,350 A | * | 2/1995 | Swanson | 379/446 |
| 5,799,914 A | * | 9/1998 | Chivallier et al. | 248/176.1 |
| 5,845,885 A | * | 12/1998 | Carnevali | 248/118.1 |
| D406,591 S | * | 3/1999 | Richter | D14/253 |
| 6,220,556 B1 | * | 4/2001 | Sohrt et al. | 248/279.1 |

* cited by examiner

Primary Examiner—Anita King
Assistant Examiner—A. Joseph Wujciak, III
(74) Attorney, Agent, or Firm—Jacobson Holman PLLC

(57) ABSTRACT

A car phone holder has a base for holding a car phone, a first suspension rod rotatably connected to a back of the base, a second suspension rod pivotally connected with the first suspension rod and a universal joint provided between the back of the base and a distal end of the first suspension rod. The universal joint allows the base to rotate in any desired direction and the pivotal engagement between the first and second suspension rods allows the base to orient in a direction required.

8 Claims, 6 Drawing Sheets

CAR PHONE HOLDER WITH A UNIVERSAL JOINT

BACKGROUND OF THE INVENTION

1. Field of the Invention

The present invention relates to a car phone holder, and more particularly to a car phone holder with a universal joint with which the car phone supported by the holder is able to pivot to any desired direction to facilitate the access for the user.

2. Description of Related Art

A conventional car phone holder, as shown in FIG. 1, has a base (1a) and an electrical suspension rod (2a) that is electrically connected to a cigarette lighter (not shown) for provide electricity to the base (1a). The base (1a) has a stub (1a) formed on a back of the base (11a) to correspond to a clamp (3a) formed on one end of the electrical suspension rod (2a). The clamp (3a) is composed of two extensions (31a) extending out in parallel from the end of the electrical suspension rod (2a), such that the stub (11a) is able to be pivotally secured between the two extensions (31a) by means of a screw (4a). With such an arrangement, the phone holder is able to pivot in relation to the end of the electrical suspension rod (2a) and the user is able to adjust the angle of the phone holder as required.

However, the phone holder can only pivot with respect to the electrical suspension rod (2a), that is, the phone holder can not be adjusted transversely to fulfill the user's need, not to mention the electrical outlet for the electrical suspension rod (2a) normally is located under the front panel of the car, which hinders the access of the user to the gear shift and thus affects the driving safety greatly.

To overcome the shortcomings, the present invention intends to provide an improved car phone holder to mitigate or obviate the aforementioned problems.

SUMMARY OF THE INVENTION

The primary objective of the invention is to provide a car phone holder enabling to pivot in all directions to facilitate the access by the user. The car phone holder includes a base, a first extension rod connected to the base and a second extension rod pivotally connected to a free end of the first extension rod. The connection between the base and the first extension rod enables the base to pivot in all directions and the connection between the first and the second extensions enables the first extension rod to pivot up and down, such that the user is able to adjust the base to any desired direction as required.

Another objective of the invention is to have an electrical outlet mounted on a mediate portion of the second extension rod, such that the user is still able to use the outlet as a cigarette lighter without worrying that the original cigarette lighter is being occupied.

Still another objective of the invention is to have the electrical wire from the base to the first extension rod detachable, such that the user is able to disassemble the base from the car phone holder and relocate it with an indoor outlet to function as a rechargeable seat for a mobile phone.

Other objects, advantages and novel features of the invention will become more apparent from the following detailed description when taken in conjunction with the accompanying drawings.

DETAILED DESCRIPTION OF PREFERRED EMBODIMENT

Figure 1:
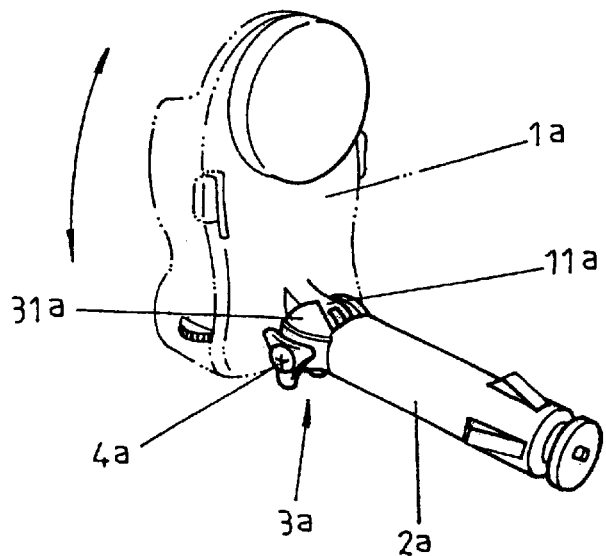
FIG. 1 is a perspective view of a conventional car phone holder.
Figure 2:
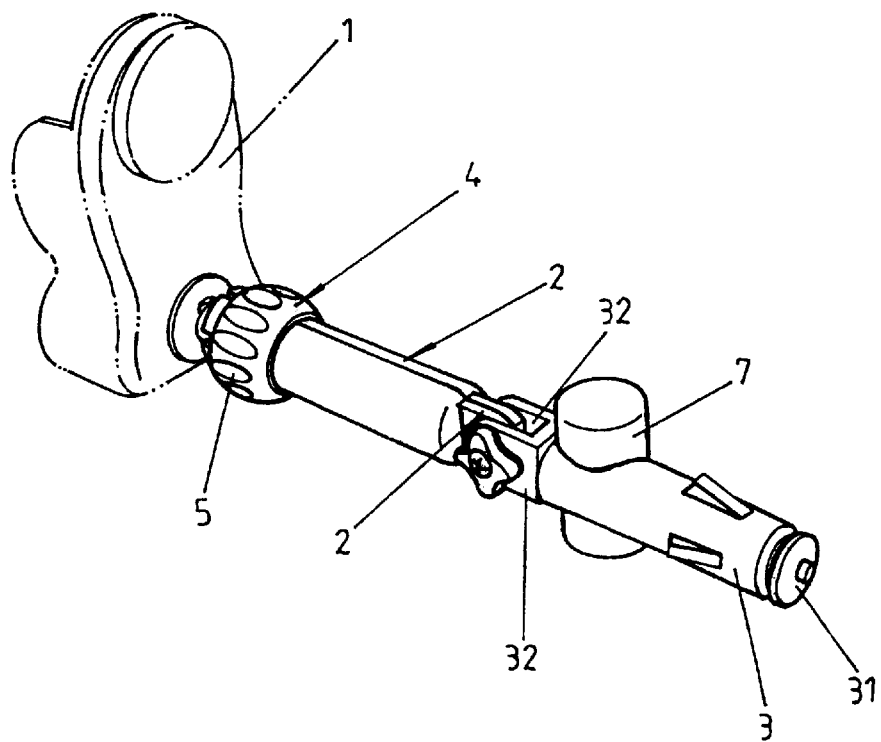
FIG. 2 is a perspective view of a car phone holder constructed in accordance with the present invention.
Figure 3:
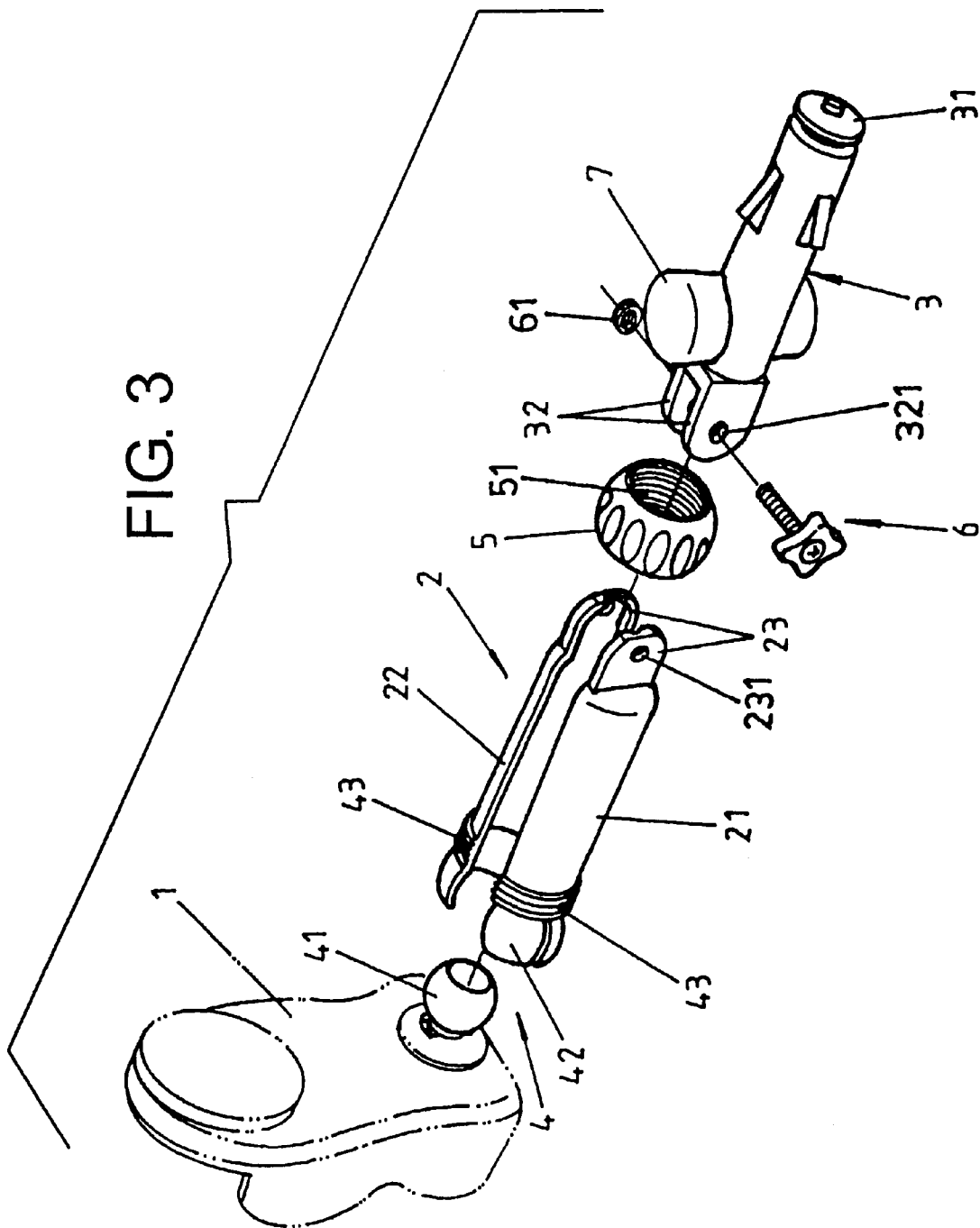
FIG. 3 is an exploded perspective view of the car phone holder of FIG. 1.

With reference to FIGS. 2 and 3, a car phone holder in accordance with the present invention has a base (1) for detachably receiving a car phone, a first suspension rod (2) and a second suspension rod (3).

A universal joint (4) is provided to pivotally engage a back of the base (1) to a first distal end of the first suspension rod (2). The universal joint (4) has a bowl (41) extending from the back of the base (1), two complementarily formed arcuate plates (42) respectively formed on a first distal end of a first and a second halves (21,22) of the first suspension rod (2), threads (43) formed on an outer peripheries of the first and the second halves (21,22) to form an annular thread around a joint between the two arcuate plates (42) and the two halves (21,22) and an annular sleeve (5) slidably engaged with the first suspension rod (2) and having inner threads (51) formed on an inner face of the annular sleeve (5) to correspond to the threads (43). Two clamping plates (23) are respectively formed on a second distal end of the first and the second halves (21,22) and each of the clamping plates (23) defines therethrough a through hole (231).

A first distal end of the second suspension rod (3). has spatially apart two plates (32) each with a hole (321) defined to align with the through holes (231) of the two clamping plates (23). A second distal end of the suspension rod (3) is provided with an electrical connection (31) adapted to connect with the cigarette lighter for providing electricity to the car phone holder of the present invention. Furthermore, an extra electrical outlet (7) is formed on a mediate portion of the second suspension rod (3), such that even the original electrical outlet on the car is occupied by the car phone holder of the invention, the extra electrical outlet (7) still provides the user an alternate choice for other car appliances.

Figure 4:
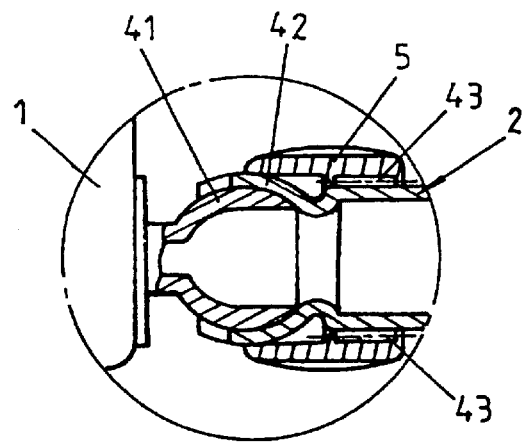
FIG. 4 is an enlarged cross sectional view of the engagement between a universal joint and a first suspension rod along the line 3—3 of FIG. 1.

When the car phone holder of the invention is in assembly, the bowl (41) is received in a space defined by the two complementary arcuate plates (42) and then the sleeve (5) slides through the first suspension rod (1) to threadingly mate with the threads (43) as well as to secure the first and second halves (21,22), which also secures the bowl (41) inside the two arcuate plates (42), as shown in FIG. 4. Thereafter the two clamping plates (23) insert between the two plates (32) of the second suspension rod (3) to align the through holes (231) with the holes (321) of the plates (32). Then, a screw (6) extends through the aligned through holes (231) and holes (321) to engage with a nut (61) to secure the engagement between the first and the second suspension rods (2,3).

Figure 5:
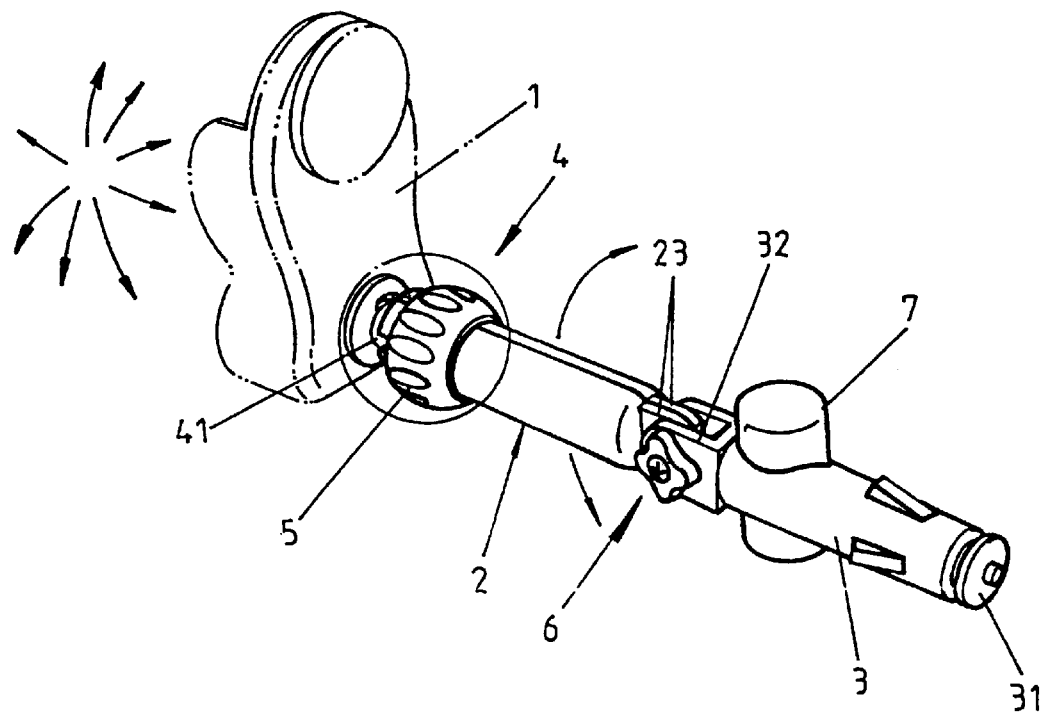
FIG. 5 is an operational schematic view showing the holder in combination with the first suspension rod is able to pivot to any desired direction.
Figure 6:
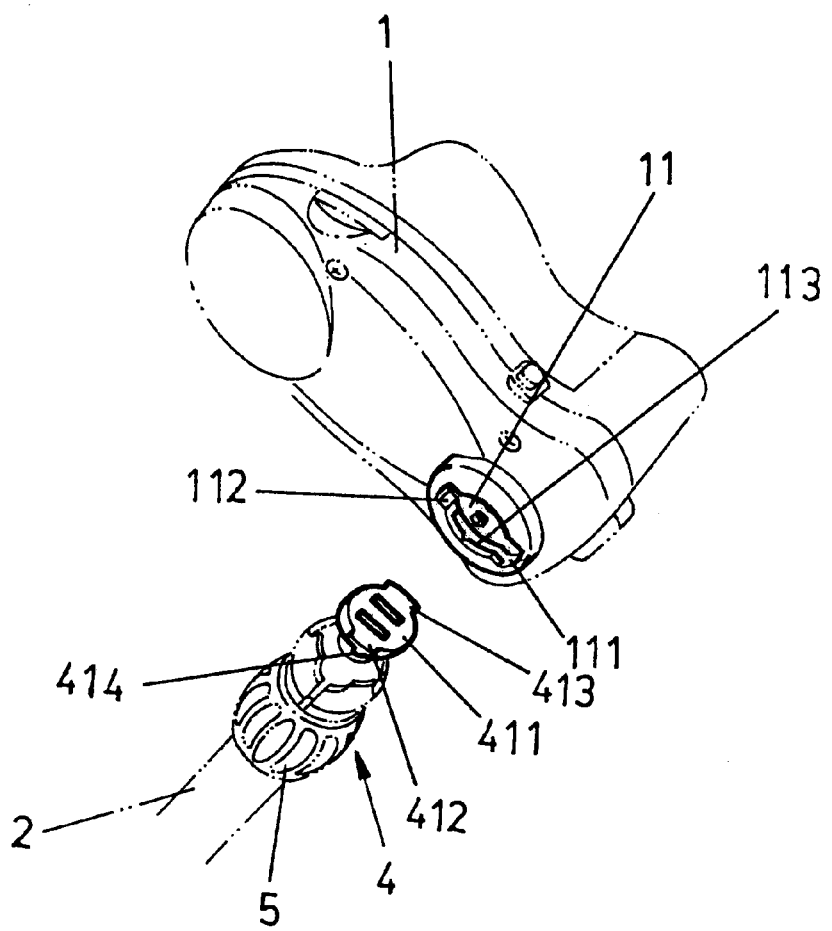
FIG. 6 is an exploded perspective view of the base and the first suspension rod.
Figure 7:
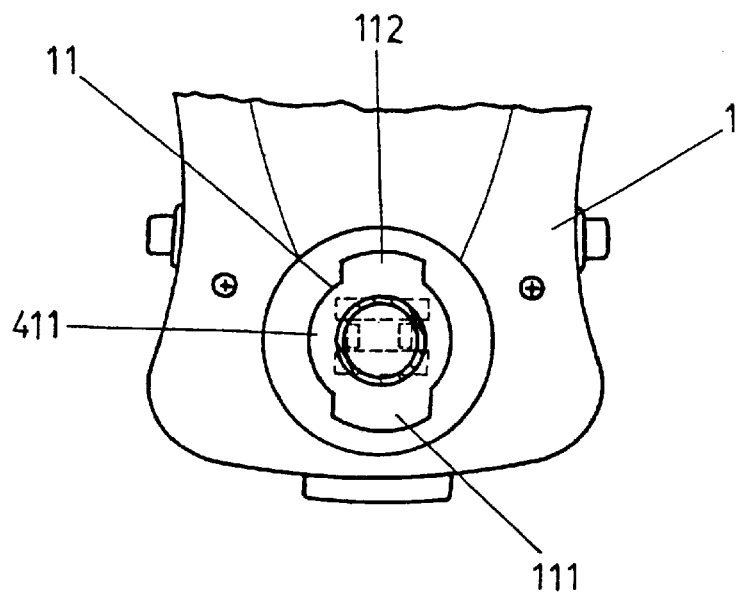
FIGS. 7 and 8 are schematic views showing the movement between the universal joint and the base.
Figure 8:
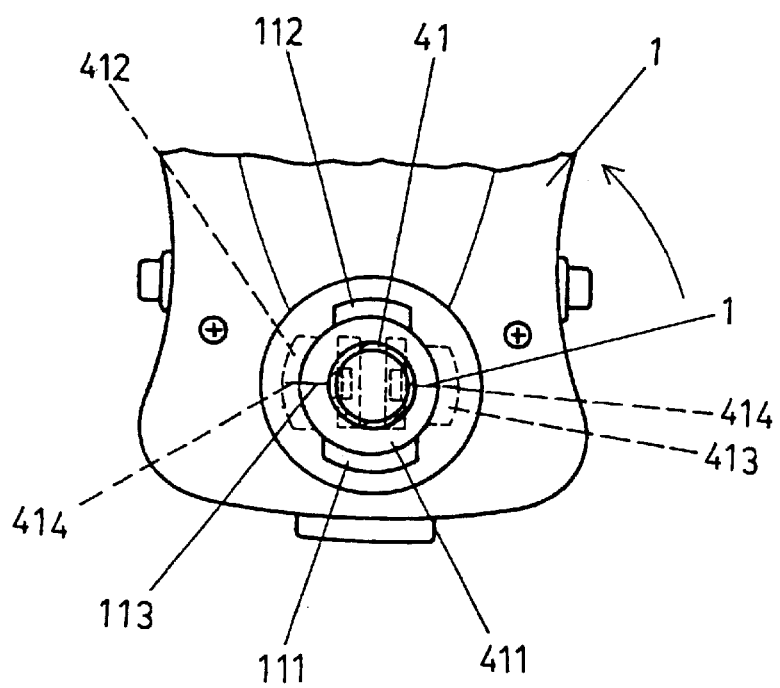
Figure 9:
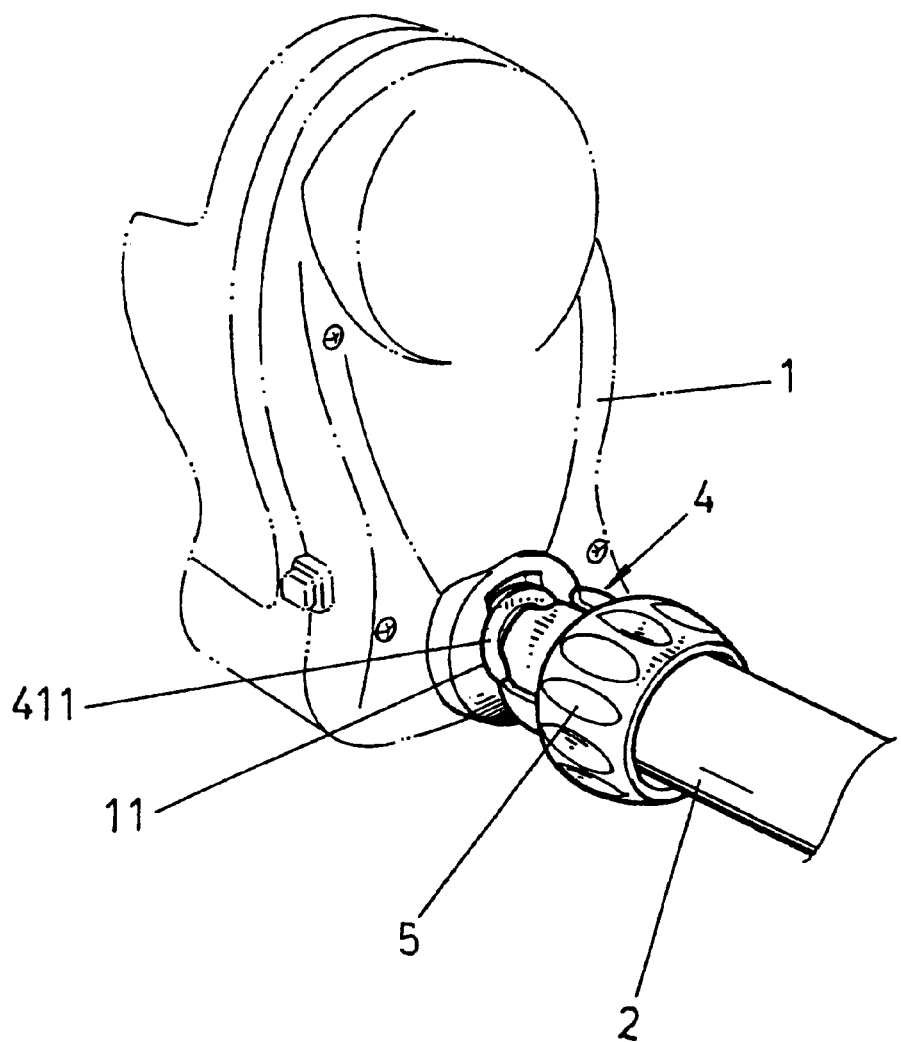
FIG. 9 is a perspective view of the assembled first suspension rod and the base, wherein for clarity, the base is in phantom line.

Because the bowl (41) is received in the space defined by the two complementarily formed arcuate plates (42), the bowl (41) is able to rotate to any direction as required and also because the two clamping plates (23) are received between the two plates (32), the second distal end of the first suspension rod (2) is pivotal with respect to a first distal end of the second suspension rod (3). With such an arrangement, the base (1) together with the first suspension rod (2) enables the user to pivot the car phone holder to any desired angle and direction, as shown in FIG. 5.

With reference to FIGS. 6 to 9, in order to facilitate the use of the car phone holder of the present invention, the base (1) has a key hole (11) with two oppositely defined notches (111,112) and the firs suspension rod (2) has a key (411) formed to correspond to the key hole (11) and having two oppositely formed ears (412,413) corresponding to the notches (111,112) respectively, such that when the base (1) and the first suspension rod (2) are assembled, correct polarity is ensured. However, to further ensure the polarity between the base (1) and the first suspension rod (2), the first suspension rod (2) further has a rib (414) formed between the distal end of the first suspension rod (2) and the universal joint (4) and a slit (113) is defined in a face defining the key hole (1 1) of the base (1) so that after the key (411) is received in the key hole (11) and rotated for 90 degree, the rib (414) is received in the slit (113) in the key hole (11).

What is claimed is:

1. A car phone holder comprising:

a base for holding a car phone;

a first suspension rod rotatably connected to a back of the base and having a first half and a second half complementarily formed and detachably connected to the first half;

a universal joint provided between the back of the base and a distal end of the first suspension rod for pivoting the base with respect to the first suspension rod;

a second suspension rod pivotally connected to a free end of the first suspension rod and having an electrical outlet engageable to the power source;

the universal joint including:

a bowl securely formed on the back of the base;

two arcuate plates respectively formed on a distal end of the first and second halves to receive the bowl therebetween; and an annular sleeve slidably connected with the first suspension rod to secure the first and second halves and the bowl inside the two arcuate plates.

2. The car phone holder as claimed in claim 1 further comprising threads formed on an outer periphery of the first and second halves to correspond to inner threads formed inside the annular sleeve.

3. The car phone holder as claimed in claim 2 further comprising a key hole defined in a base of the base and having two oppositely defined notches and a key formed on distal end of the first suspension rod to correspond to the key hole and having two opposite ears corresponding to the notches.

4. The car phone holder as claimed in claim 3 further having a rib formed between the key and the universal joint and a slit defined in a face defining the key hole to correspond to the rib.

5. The car phone holder as claimed in claim 1 further comprising a key hole defined in a base of the base and having two oppositely defined notches and a key formed on distal end of the first suspension rod to correspond to the key hole and having two opposite ears corresponding to the notches.

6. The car phone holder as claimed in claim 5 further having a rib formed between the key and the universal joint and a slit defined in a face defining the key hole to correspond to the rib.

7. The car phone holder as claimed in claim 1 further comprising a key hold defined in a base of the base and having two oppositely defined notches and a key formed on distal end of the first suspension rod to correspond to the key hole and having two opposite ears corresponding to the notches.

8. The car phone holder as claimed in claim 7 further having a rib formed between the key and the universal joint and a slit defined in a face defining the key hole to correspond to the rib.

* * * * *